United States Patent
Guix Diaz et al.

(10) Patent No.: US 10,032,541 B2
(45) Date of Patent: Jul. 24, 2018

(54) REINFORCEMENT ARRANGEMENT FOR SUBMARINE CABLE CONNECTIONS

(71) Applicant: GRUPO GENERAL CABLE SISTEMAS, S.L.U., Barcelona (ES)

(72) Inventors: Enric Guix Diaz, Barcelona (ES); Daniel Isus Feu, Barcelona (ES)

(73) Assignee: GRUPO GENERAL CABLE SISTEMAS, S.L.U., Barcelona (ES)

( * ) Notice: Subject to any disclaimer, the term of this patent is extended or adjusted under 35 U.S.C. 154(b) by 2 days.

(21) Appl. No.: 15/113,623

(22) PCT Filed: May 5, 2014

(86) PCT No.: PCT/ES2014/070384
§ 371 (c)(1),
(2) Date: Jul. 22, 2016

(87) PCT Pub. No.: WO2015/169976
PCT Pub. Date: Nov. 12, 2015

(65) Prior Publication Data
US 2017/0004904 A1 Jan. 5, 2017

(51) Int. Cl.
| H01B 7/14 | (2006.01) |
| H02G 15/14 | (2006.01) |
| H01B 13/00 | (2006.01) |
| H02G 15/007 | (2006.01) |
| H02G 15/18 | (2006.01) |

(52) U.S. Cl.
CPC ........... *H01B 7/14* (2013.01); *H01B 13/0036* (2013.01); *H02G 15/007* (2013.01); *H02G 15/14* (2013.01); *H02G 15/182* (2013.01)

(58) Field of Classification Search
USPC ........................................................ 174/71 R
See application file for complete search history.

(56) References Cited

U.S. PATENT DOCUMENTS

| 4,621,168 A * | 11/1986 | Bryant | H02G 15/14 156/48 |
| 2010/0163275 A1* | 7/2010 | Hiel | B29C 70/52 174/124 R |

* cited by examiner

Primary Examiner — William H Mayo, III
Assistant Examiner — Krystal Robinson

(57) ABSTRACT

A reinforcement arrangement for use with the connections of cable spices of undersea power cables that transport of electrical energy is disclosed. Each power cable includes an inner conducting core of copper or aluminum with one or more concentric polymeric and metallic layers that constitute insulation, screens and covers. The reinforcement arrangement is applied to the splicing of two cables at the conducting cores of each power cable, called a conducting cores connection area. The reinforcement arrangement includes a body that is disposed radially on the conducting cores connection area and on over the adjacent area of the outside outer covering of the power cable. The body is joined to the outer part covering of the power cables through a mechanical attaching element. The invention also relates to a method used to apply the reinforcement arrangement to the junctions of two submarine cables.

16 Claims, 3 Drawing Sheets

REINFORCEMENT ARRANGEMENT FOR SUBMARINE CABLE CONNECTIONS

OBJECT OF THE INVENTION

One of the objects of the present invention, as expressed in the title of this specification, refers to a reinforcement device used in submarine cable connections, with a novel design that makes the connections between two ends of cable very strong and flexible when they are subjected to the mechanical stress or pressure that these cables are often subjected to in the locations where they are placed.

Another aim of the invention is a method or procedure for applying the present reinforcement device to the connections of submarine cables.

TECHNICAL FIELD OF THE INVENTION

The field of application of the invention is in the sector of submarine power cables for the transport of electrical energy, and especially in the area of protective elements used to protect the connections of cables placed on the seabed.

BACKGROUND OF THE INVENTION

It is known that in order to install long lengths of submarine power cable, shorter sections of the aforementioned cables must be joined together, necessarily leading to the existence of connections or splicing between these sections. The splices must be protected in order to be able to withstand deep underwater conditions, which imply significant mechanical stress, thus keeping breakage from occurring at these connection points.

In this sense, the state of the art includes the existence of different types of devices, such as connectors, waterproof plugs, casings, and frames, and methods that are used to reinforce and protect the connections of the submarine cables. U.S. Pat. No. 4,644,097 is for armoured submarine cable, wherein the armouring surrounds connections of cores of cables on the outside, and the layer of armouring includes at least one section of heavy armour that includes at least one layer of heavy metal wiring, and a section of light armour, which comprises ends, with a transition area where both sections come together, so that the rigidity and flexibility of the cable can be controlled.

Other devices available on the market include armouring that uses copper shells to secure the splice between the cores of the cables.

These devices have the disadvantage of increasing both the diameter of the cross section and the weight of the splicing, and in general they don't bear mechanical stress very well, and therefore their structures tend to break, and in most cases, they are expensive to manufacture.

These disadvantages are overcome by the placement of reinforcement for the connections of submarine cables in the present invention, which is made using a body arranged in the area where the cable is connected, acting as insulation and very secure reinforcement, able to bear great mechanical stress. They don't break and they allow for a lightening of the weight of the cable in the connections or splicing, as well as being strongly resistant to corrosion and fatigue. They also allow a reduction in the cost of the devices that are usually used to reinforce this type of connections.

DESCRIPTION OF THE INVENTION

The present invention refers to a reinforcement arrangement used in the connection of two ends of submarine cable, said cables including a copper or aluminium conducting core with one or more polymeric and metallic layers that constitute insulation, screens and covers, wherein said cores are joined by known methods. The arrangement consists of reinforcement on a body that is placed in a radial manner on the area of the connection of the cable and on the adjacent area of the outer covering of the cable; the body is made up of a material reinforced with fibres of great mechanical strength, joined to the outer part of the cable by a mechanical attachment element, so that the area of the connection of the cable bears a breaking load in a range of 96% to 100% of the breaking load of the cable without any connection. Said body makes the connection or splice of the cables very sturdy and elastic, suitable for bearing the mechanical stress or pressure that these connections are subject to in the areas where they are placed.

The arrangement of reinforcement can comprise more than two bodies made up of said material reinforced with fibres of great mechanical strength, these bodies being placed concentrically in a radial direction.

The body can have a structure chosen to be half-round, braided mesh, lengthwise fibres, or a combination of the above. These arrangements are suitable for guaranteeing withstanding the high levels of mechanical stress that said connections are subject to.

The fibres of great mechanical strength are chosen from the group made up of carbon fibres, fibreglass, aramid fibres, metallic fibres, graphene fibres, and synthetic fibres, wherein the body reinforced with said fibres additionally comprises a resin made up of a polymeric matrix, loads and additives, which are necessary to shape said body.

The fibres can be arranged in the body of the reinforcement device in the same direction or in different directions, which will be in function of the mechanical strength desired and the stress that the reinforcement of the invention must bear.

Preferably, the body of the reinforcement arrangement of the invention will be made up of more than one sheet of a material reinforced with fibres of great mechanical strength, wherein the direction of the fibres between each sheet can be arranged in alternating directions or not, in this manner increasing the mechanical strength of the arrangement.

Alternatively, the various sheets can decrease in length in the axial direction of the cable as they are placed in a radial direction, comprising a last upper sheet that covers all of the sheets underneath.

The body of the reinforcement arrangement will have a thickness defined by its outside diameter, varying from 0.5 mm. to 20 mm. in thickness, which guarantees that the reinforcement structure will weigh less and thus be easier to handle when it is put in place in the workplace.

For its part, the mechanical attaching element used to join the body to the outer part of the cable on the connection area is a structural adhesive.

Preferably, the body of the reinforcement arrangement of the invention comprises a structure in a half-round shape wherein each half-round shape comprises more than one sheet of carbon fibres arranged in such a manner that the direction of the carbon fibres alternate between sheets; these sections should be arranged in a radial direction on the outside and facing each other on the connection area of the cable, said half-round shapes being joined to the cable through a structural adhesive, so that the connection area of the cable is suitable for bearing a breaking load of more than the 100% of the breaking load of the cable without the connection.

Optionally, the arrangement of the reinforcement of the invention may be accompanied by other reinforcement elements such as shells, armouring, or mesh, arranged in a radial manner on the body in such a way that they exert additional pressure on the reinforcement arrangement and they make it possible to increase the strength of the structure.

According to another aspect of the present invention, a method is provided to apply to an arrangement to reinforce the connection of two ends of power cables, each of them including a conducting core of copper or aluminium, with one or more polymeric and metallic layers that constitute insulation, screens, and covers. The method includes the stages of the preparation of the surface of the cable to be reinforced, and of the preparation and application of a body made up of at least one sheet of a material reinforced with fibres of great mechanical strength.

The first phase of the preparation of the surface of the cable to be reinforced comprises the operations of: sanding of the surface of the cable, pneumatic cleaning, blazing of the surface, and application of a polarizing agent to said surface.

The stage of preparation and application of the body made up of at least one sheet of a material reinforced with fibres of great mechanical strength includes the following steps:
 a) shaping of the body comprising at least one sheet of a material reinforced with fibres of great mechanical strength wherein said structure is chosen from: half-round, braided mesh, lengthwise fibres, or a combination of the above.
 b) placement of the body on the connection area of the cable through the application of a mechanical attaching element.
 c) the attachment of these sections onto the cable using a means of holding in place, such as bands, springs, or others, in such a manner that the body of the reinforcement device is kept under pressure on the connection area of the cable.

Additionally, the method for the application of the reinforcement may include the application of thermoretractable bands and thermal treatments at temperatures of 50° C. to 500° C., which makes the reinforcement strong and impermeable.

Other details and characteristics will be shown in the course of the description below, which refers to the drawings that go with this report, in which one practical form of the invention is shown for the purposes of illustration, not limitation.

PREFERABLE EMBODIMENT OF THE INVENTION

Figure 1:
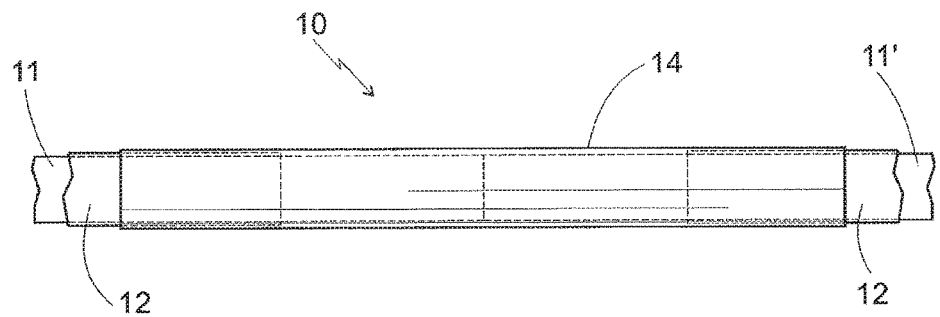
FIG. 1 is an upper plan view of the reinforcement arrangement of the invention.
Figure 2:
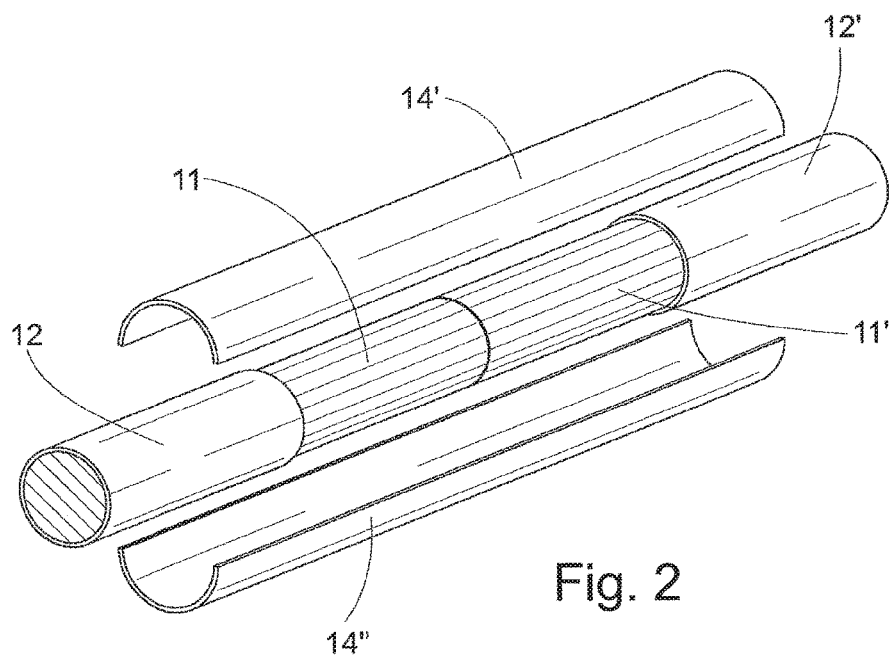
FIG. 2 is an exploded view of a form of the arrangement of the invention.

The referred invention, as is shown in FIGS. 1 and 2, refers to an arrangement of reinforcement (10) applicable to connections of submarine power cables, wherein the cable includes a conducting core (11,11') of copper or aluminium with one or more (12,12') polymeric and metallic layers that constitute insulation, screens and covering, wherein the connections between the conducting cores are made using known methods, such as welding, for example.

The arrangement comprises a body (14) that is arranged in a radial manner on the connection area of the cable and on the adjacent area of the outer covering of the cable.

The body (14) is made up of a material reinforced with fibres of great mechanical strength, joined to the outer part of the cable by way of a mechanical attaching element.

The reinforcement arrangement gives the splicing of the cables reinforcement that is very strong, able to withstand very great mechanical stress, pressure, and force, which these cables are normally subject to in the settings where they are used; on the other hand, this reinforcement is also light and elastic, facilitating the handling of the splicing while they are being placed on the seabed. Specifically, the arrangement allows the connection area of the cable to bear a breaking load in a range of 96% to 100% of the breaking load of the cable without the connection.

Figure 3:
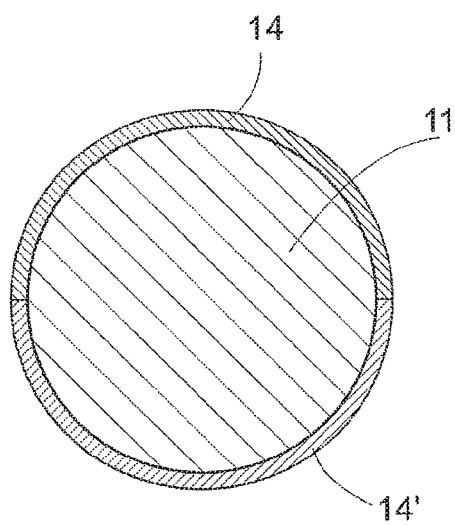
FIG. 3 is a cutaway view according to direction B-B' of FIG. 1; it illustrates a form of the invention in which the arrangement of the reinforcement includes the body with a half-round shape.

The body (14) of the reinforcement arrangement (10) can have a structure chosen to be half-round, braided mesh, lengthwise fibres, or a combination of the above. FIG. 3 shows the form when the body includes a half-round (14', 14") structure.

Figure 4:
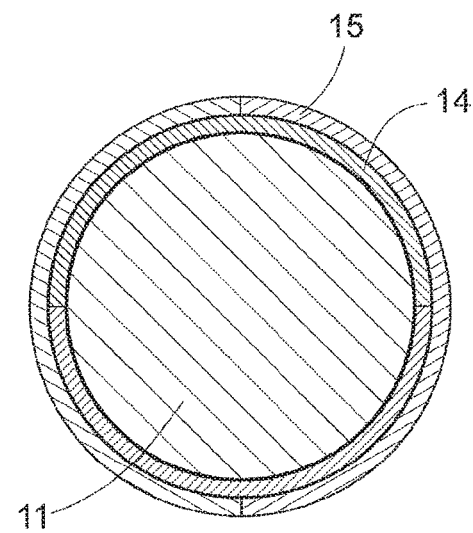
FIG. 4 is a cutaway view illustrating a form of the invention showing two bodies with a half-round shape arranged in a radial manner.

Additionally, the reinforcement arrangement in question, as is shown in FIG. 4, can include more than two bodies (14,15) made up of a material reinforced with fibres of great mechanical strength, these bodies being placed concentrically in a radial direction. Specifically, FIG. 4 illustrates the form of the invention when both bodies (14,15) have a half-round shape. However, as has been mentioned, the bodies can have different shapes and can be combined to achieve a reinforcement arrangement that allows the connection area to bear great mechanical stress.

The connection of the body (14) to the connection area of the cables and between the different bodies (14,15) is done using a mechanical attaching element, preferably a structural adhesive.

In order to be able to bear greater mechanical stress and tensions, the body (14) reinforced with very strong fibres can comprise the fibres arranged in the same direction or in different directions.

Figure 5:
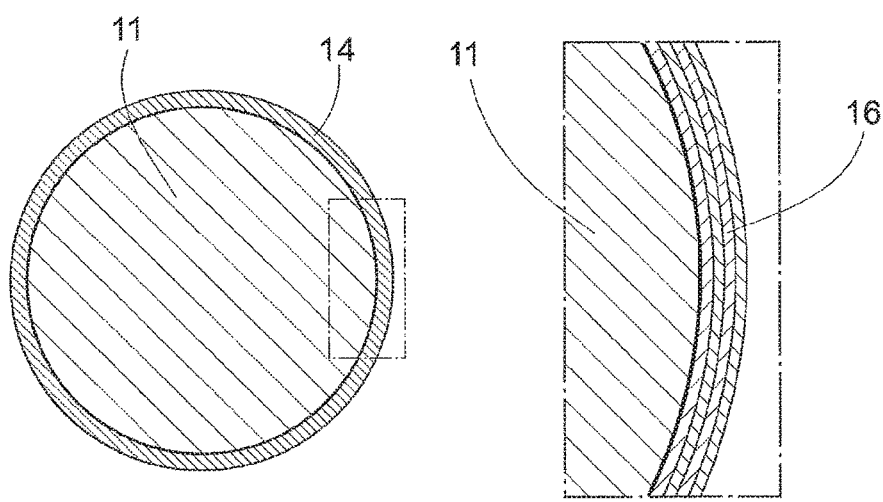
FIG. 5 is a cutaway view of a form of the invention wherein the body is made up of more than one sheet reinforced with fibres of great mechanical strength.
Figure 6:
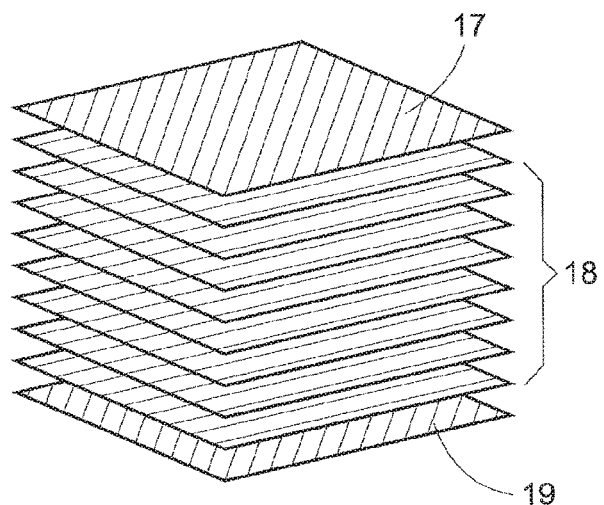
FIG. 6 illustrates a variation in the arrangement of these sheets reinforced with fibres of great mechanical strength.

Additionally, in another form of the invention, as is shown in FIG. 5, the body (14) can be made up of more than one sheets (16) reinforced with fibres of great mechanical strength, wherein these sheets can be arranged with each other in such a way that the direction of these fibres alternates in different directions between the sheets or not, as is shown in FIG. 6.

FIG. 6 shows one of the possible forms that the sheets can be placed in to shape the body (14); in this example, there are: an inner sheet (17) that covers the connection area of the cable, more than one middle sheet (18) and an outer sheet

(19) that covers the inner sheets. This distribution makes the reinforcement arrangement very strong under mechanical stress and tensions, and therefore the connection areas of the conducting cables (11,11') are reinforced, and the cables with the reinforcement arrangement are suitable for bearing a breaking load of between 96% and 100% of the breaking load of the cable without the connection.

Figure 7:
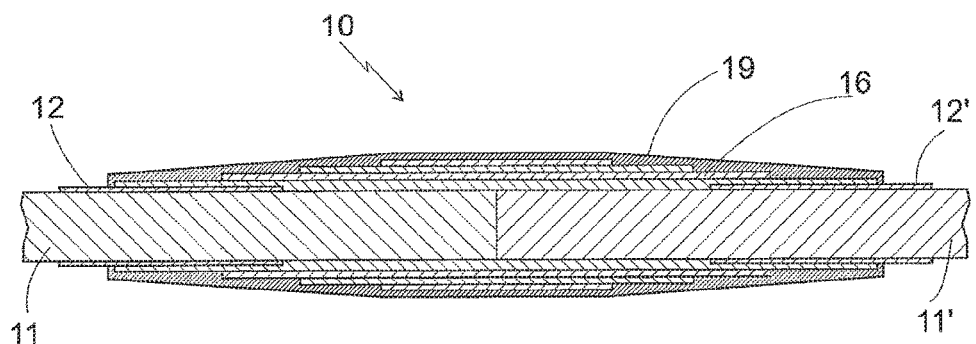
FIG. 7 is a cutaway view showing another form of the invention in which more than one sheet are arranged in such a manner that said sheets decrease in length in the axial direction of the cable as they are arranged in a radial direction.

Additionally, as is shown in FIG. 7, the various sheets (16) can be placed in an arrangement in which the aforementioned sheets decrease in length in the axial direction of the cable as they are arranged in a radial direction, including a final upper sheet (19) that covers all of the lower ones.

With the reinforcement arrangement of the invention the splicing of the cables gets very strong reinforcement, which can withstand the high levels of mechanical stress, pressure, and force that the aforementioned cables are subject to in the settings where they are used. Also, thanks to the materials used, the reinforcement is light and small, with a thickness that may vary from 0.5 mm. to 20 mm., and with an elasticity that facilitates the handling of splices during the process of placing the cables underwater.

The present invention being described sufficiently in relation to the example of the form set out herein, it is easy to understand that any changes in details that are deemed suitable can be made, as long as the essence of the invention, which is summarised in the following claims, is not altered.

The invention claimed is:

1. Reinforcement arrangement applicable to the connections between undersea power cables for the transport of electrical energy, wherein each power cable includes an inner conducting core of copper or aluminium with one or more concentric polymeric and metallic layers that constitute insulation, screens, and covering, and wherein spliced connections between the conducting cores of each power cable are capable of being made by welding and form a conducting cores connection area, wherein the arrangement comprises a body disposed radially on the conducting cores connection area and the adjacent area of the outer covering of the power cable, the body being made of a material reinforced with fibres selected from the group of carbon fibres, fibreglass, aramid fibres, fibres, graphene metallic fibres, and synthetic fibres, the body being joined to the outer covering of the power cable through a mechanical attaching element, so that the connection area of the power cables bears a breaking load of 96% to 100% of the breaking load of the cable without connection.

2. Reinforcement arrangement according to claim 1, wherein it comprises two or more bodies made up of a material reinforced with fibres, said bodies being arranged concentrically in a radial direction.

3. Reinforcement arrangement according to claim 1, wherein the body may have a structure chosen to be: half-round, braided mesh, lengthwise fibres, or a combination of the thereof.

4. Reinforcement arrangement according to claim 1, wherein the body reinforced with fibres also comprises a resin made up of a polymeric matrix, loads, and additives.

5. Reinforcement arrangement according to claim 1, wherein the body reinforced with fibres includes the fibres arranged in the same direction or in different directions.

6. Reinforcement arrangement according to claim 1, wherein the body comprises a plurality of sheets of a material reinforced with fibres arranged in such a manner that the direction of these fibres alternate in different directions or not between the sheets, and wherein the body is of a thickness varying from 0.5 mm to 20 mm.

7. Reinforcement arrangement according to claim 6, wherein the plurality of sheets decrease in length in the axial direction of the cable as they are arranged in a radial direction, including a final upper sheet that covers all of the lower ones.

8. Reinforcement arrangement according to claim 1, wherein the mechanical attaching element is a structural adhesive.

9. Reinforcement arrangement according to claim 1, wherein the body includes a structure with a half-round shape wherein each half round comprises more than one sheet of carbon fibres arranged in such a manner that the direction of these carbon fibres alternates between sheets, these sections being arranged in a radial manner outside and facing each other on the connection area of the cable, and joined together and to the cable using a structural adhesive, so that the connection area of the cable is able to bear a breaking load of more than 100% of the breaking load of the cable without a connection.

10. Reinforcement arrangement according to claim 1, wherein it comprises additional reinforcement elements such as shells, armouring or mesh, arranged in a radial manner on the body in such a way that they place additional pressure on the same.

11. Reinforcement arrangement according to claim 1, wherein the body is comprised of two semi-circular structures disposed radially around the conducting cores connection area to circumferentially surround said connection area.

12. A method for the application of a reinforcement arrangement defined according to claim 1, wherein it comprises the stages of preparation of the surface of the power cable to be reinforced, and the preparation and application of a body made up of at least one sheet of a material reinforced with fibres selected from the group of carbon fibres, fibreglass, aramid fibres, fibres, graphene metallic fibres, and synthetic fibres.

13. A method according to claim 12, wherein the first stage of preparation of the surface of the cable to be reinforced comprises the operations of sanding the surface of the cable, pneumatic cleaning, the blazing of the surface, and the application of a polarizing agent to the aforementioned surface.

14. A method according to claim 12, wherein the stage of preparation and application of the body made up of at least one sheet of a material reinforced with fibres includes the following steps:
   a) shaping of the body comprising at least one sheet of the material reinforced with fibres wherein said structure is chosen from: half-round, braided mesh, lengthwise fibres, or a combination of the above;
   b) placement of the body on the connection area of the cable through the application of a mechanical attaching element;
   c) the holding of these sections onto the cable using means of attachment such as bands, springs, or others, in such a manner that the body of the reinforcement arrangement is held against the connection area of the cable.

15. A method according to claim 12, wherein it may additionally comprise the application of thermoretractable bands and thermal treatments at temperatures of 50° to 500° Celsius.

16. Reinforcement arrangement according to claim 1, wherein the body is coaxial with the inner conducting cores at the conducting cores connection area.

* * * * *